(12) United States Patent
Jovin et al.

(10) Patent No.: US 6,399,935 B1
(45) Date of Patent: Jun. 4, 2002

(54) PROGRAMMABLE SPATIALLY LIGHT MODULATED MICROSCOPE ND MICROSCOPY

(75) Inventors: Thomas M. Jovin; Quentin Hanley; Peter Verveer, all of Göttingen (DE)

(73) Assignee: Max-Planck-Gesellschaft zur Forderung der Forderung der Wissenschaften E.V., Munich (DE)

( * ) Notice: Subject to any disclaimer, the term of this patent is extended or adjusted under 35 U.S.C. 154(b) by 0 days.

(21) Appl. No.: 09/176,240

(22) Filed: Oct. 21, 1998

(30) Foreign Application Priority Data

Oct. 22, 1997 (EP) .............................. 97118354

(51) Int. Cl.$^7$ ................................ H01J 3/14
(52) U.S. Cl. ...................... 250/216; 359/385
(58) Field of Search ................ 250/216, 201.3–201.8; 359/385, 389, 368, 618, 619, 227, 230; 356/310, 330

(56) References Cited

U.S. PATENT DOCUMENTS 5,532,873 A * 7/1996 Dixon ........................ 359/388
5,587,832 A * 12/1996 Krause ....................... 359/385
6,038,067 A * 3/2000 George ....................... 359/368

FOREIGN PATENT DOCUMENTS

| EP | 0 485 803 A1 | 10/1991 |
| WO | WO 97/31282 | 8/1997 |
| WO | WO 97/34171 | 9/1997 |

OTHER PUBLICATIONS

European Patent Office, European Search Report, Apr. 24, 1998, Application No. EP 97 11 8354, 4 pages.

* cited by examiner

Primary Examiner—Que T. Le
Assistant Examiner—Thanh X. Luu
(74) Attorney, Agent, or Firm—Duane Morris LLP (57) ABSTRACT

A confocal optical imaging system comprises light source means (110, 310, 410, 710), detector means (150, 160, 350, 360, 450, 750) with at least one two-dimensional detector camera, and spatial light modulator means (120, 320, 420, 720) with a first (121a) and a second group (121b) of modulator elements, wherein the first group of modulator elements is adapted to illuminate an object to be investigated according to a predetermined pattern sequence of illumination spots focused to conjugate locations (141, 341, 441) of the object from which detection light is directed to the detector means for forming a first image $I_c$, and the second group of elements is adapted to illuminate the object at non-conjugate locations and/or to direct detection light from non-conjugate locations of the object to the detector means for forming a second image $I_{nc}$. In an optical imaging method using this system, the first and second images are collected simultaneously or subsequently.

21 Claims, 7 Drawing Sheets

PROGRAMMABLE SPATIALLY LIGHT MODULATED MICROSCOPE ND MICROSCOPY

The invention generally relates to confocal microscopes and more particularly to programmable spatially light modulated or programmable array microscopes and to a microscopy method which employs freely programmable patterns for illumination and/or detection.

Confocal microscopy based on point scanning systems with conjugate pairs of illumination and detection apertures is an effective tool for imaging a microscopic object to be investigated with direct optical sectioning. The discrete aperture spots are illuminated in the object plane of the microscope from which reflected or fluorescent light is observed through the conjugate detection apertures in an image plane. Commonly used confocal microscopes based on scanning systems with mechanically translated aperture disks (so-called Nipkow disks with a plurality of apertures) or with rotating mirrors being adapted to scan an object with a laser beam (Confocal Laser Scanning Microscopy, CSLM).

Both scanning systems have certain limitations. The aperture disks yield particularly a restriction of the illumination field, a degraded contrast and high intensity losses. Typically less than 3% of the disk is transmissive since the spacing between the pinholes must be large to maintain the confocal effect. On the other hand, the scanning mirrors of CSLM result in a low duty cycle imposed by the sequential single point data acquisition.

Figure 9:
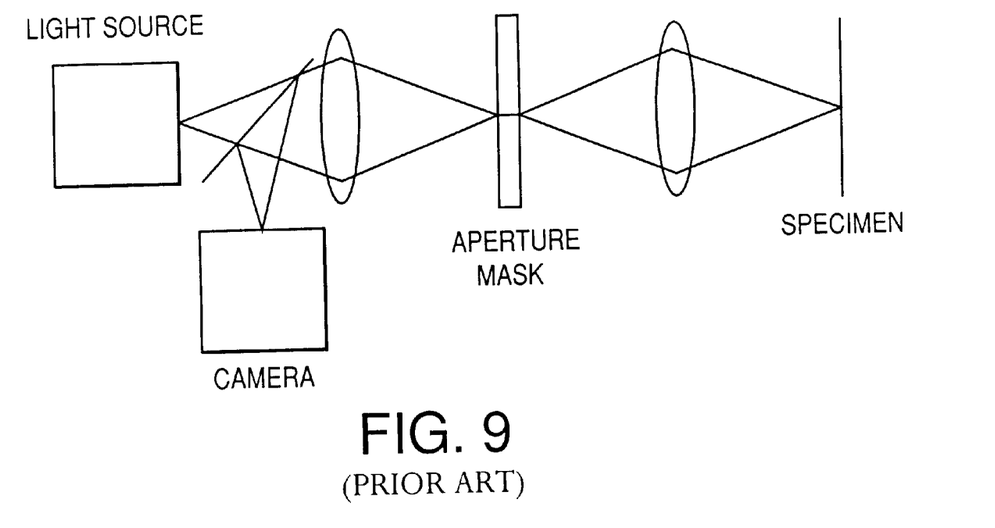
FIG. 9: a schematic view of an existing system for the generation of uncorrelated apertures using rotating disk technology (prior art)

The problem of intensity losses has been countered by the introduction of aperture correlation microscopes as described by R. Juškaitis, T. Wilson et al. in "Nature" (vol. 383, 1996, p. 804–806) and by T. Wilson, R. Juškaitis et al. in "Optics Letters" (vol. 21, 1996, p. 1879–1881). Such a microscope as schematically shown in FIG. 9 uses for specimen illumination a multiple-point source being formed by a combination of the light source with a programmable aperture mask. The detection of the light reflected by the specimen is obtained by a camera through the same aperture mask. The aperture mask is a fast spatial light modulator formed by an array of addressable pixels or a rotating disk with fixedly impressed modulation codes.

The mask carries a pattern of uncorrelated openings and closings increasing the transmissivity of the disk to about 50%. Due to the correlation avoiding coding sequence used by Juškaitis et al., the detected image is a superposition of a confocal image with a conventional image. For obtaining a final confocal image, it is necessary to detect independently a separate conventional image (e.g. by a blank sector in a rotating disk) to be subtracted from said superposition.

This additional detection of a conventional image is time consuming, so that only a restricted data acquisition rate is available. The applicability of the aperture correlation technique is further limited due to the restricted transmissivity. Therefore, fluorescence measurements are only possible in exceptional cases with high fluorescence yields. A corresponding increase of the illumination intensity could lead to unacceptable photodamage or bleaching reactions.

Figure 10:
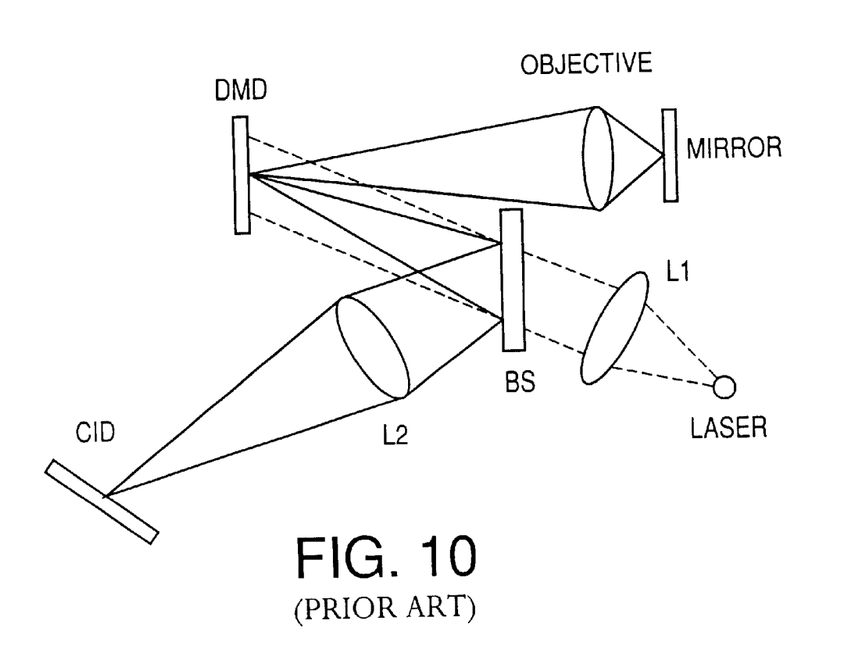
FIG. 10: a schematic view of a spatially light modulated confocal microscope (prior art).

With regard to these disadvantages, an improved spatially light modulated microscope has been described by M. Liang et al. in "Optics Letters" (vol. 22, 1997, p. 751–753) and in the corresponding U.S. Pat. No. 5,587,832. This prior art microscope is schematically shown in FIG. 10. A two-dimensional spatial light modulator is formed by a digital micromirror device (in the following: "DMD") which reflects the illumination light from the source (laser or white light source) to the probe and the detection light from the probe to a two-dimensional detector. Each micromirror of the DMD is individually controllable to form an illumination and detection spot or not.

The use of a DMD as a light modulator allows the direct detection of confocal images. Furthermore it is possible to determine the minimum confocal pattern period (distance of micromirror forming illuminating spots) without compromising the confocality. Nevertheless, the microscope of U.S. Pat. No. 5,587,832 suffers from a limited illumination intensity as only a part of the object reflected light can be used for imaging. Furthermore, this light used for imaging has an "out-of-focus" offset influencing the SNR of the confocal image in an disadvantageous manner. Finally, the prior art microscope is specialized to confocal imaging without the possibility of obtaining conventional images.

The real-time confocal microscopy or imaging, in particular in the field of imaging biological objects like cells or parts thereof, calls for further improvements with regard to sensitivity, detection speed and for an extended applicability by the implementation of further measurement principles.

It is the object of the present invention to provide an improved device and method for confocal imaging allowing rapid data acquisition, in particular with effective optical sectioning, high spatial resolution and/or high optical efficiency. It is a particular object of the invention to provide rapid two- or three-dimensional imaging of biological or chemical materials (e.g. living cells, reaction composites etc.) and thus information about molecular structure and function. Due to the inherent sensitivity and selectivity, molecular fluorescence is a preferred spectroscopic phenomenon to be implemented with the new imaging device and method.

The above object is solved by a confocal imaging device or method comprising the features of claim 1 or 14, respectively. Advantageous embodiments of the invention are defined in the dependent claims.

The basic idea of the inventors is the operation of a confocal optical imaging system as e.g. a programmable spatially light modulated confocal microscope (in the following: PAM) with spatial light modulator means (in the following: SLM) such that the entire light output from a specimen or object is dissected into two images being collected simultaneously or subsequently. Generally, spatial light modulator means comprise an array of modulator elements the transmission or reflections properties of which being individually controllable. With a first group of SLM modulator elements ("on"-elements), the object is illuminated and a focal conjugate image is collected, while with a second group of SLM modulator elements ("off"-elements), a non-conjugate image is collected. The non-conjugate image contains out-of-focus light. The illumination spots formed by the SLM modulator elements are focused to a focal plane of the object.

When positioned at the image plane of a microscope, the SLM elements each of which being conjugate to a distinct point in the focal plane of the object define a programmable array which is used for illumination and/or detection.

Figure 2:
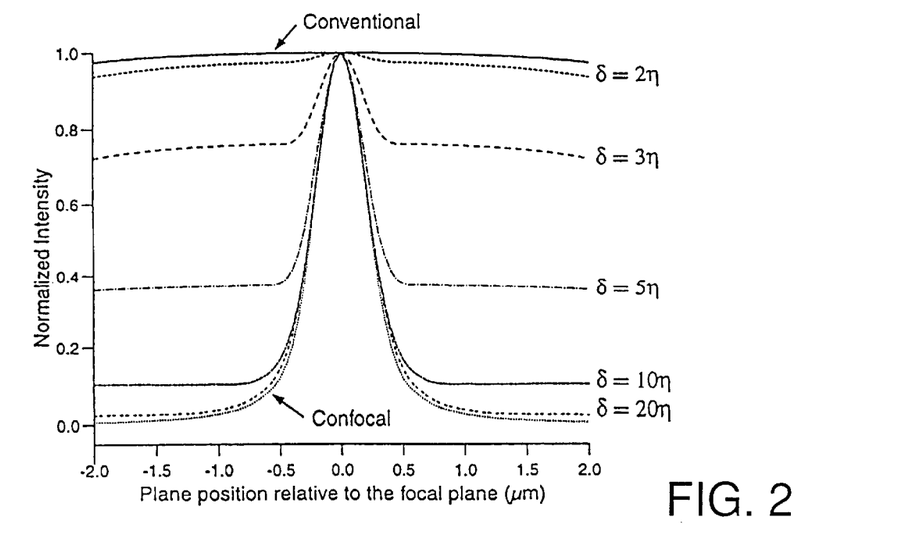
FIG. 2 a simulation of the imaging of an infinite plane in dependence on illumination spot lattice distances.

The modulator elements of the first group are individually controllable such that the pattern sequence of illumination spots is represented by a time-dependent systematically shifting grid pattern or a pattern based on a pseudo-random sequence of finite length. In the first case, the first image is an image corresponding to a confocal image and the second image is a difference image between a non-confocal image and the first image. In the second case, the first image is a superposition of confocal image and a non-confocal image and the second image is a difference image between a non-confocal image and a confocal image. In any case, the first image can contain a portion of a conjugate image as shown in FIG. 2.

Figure 4:
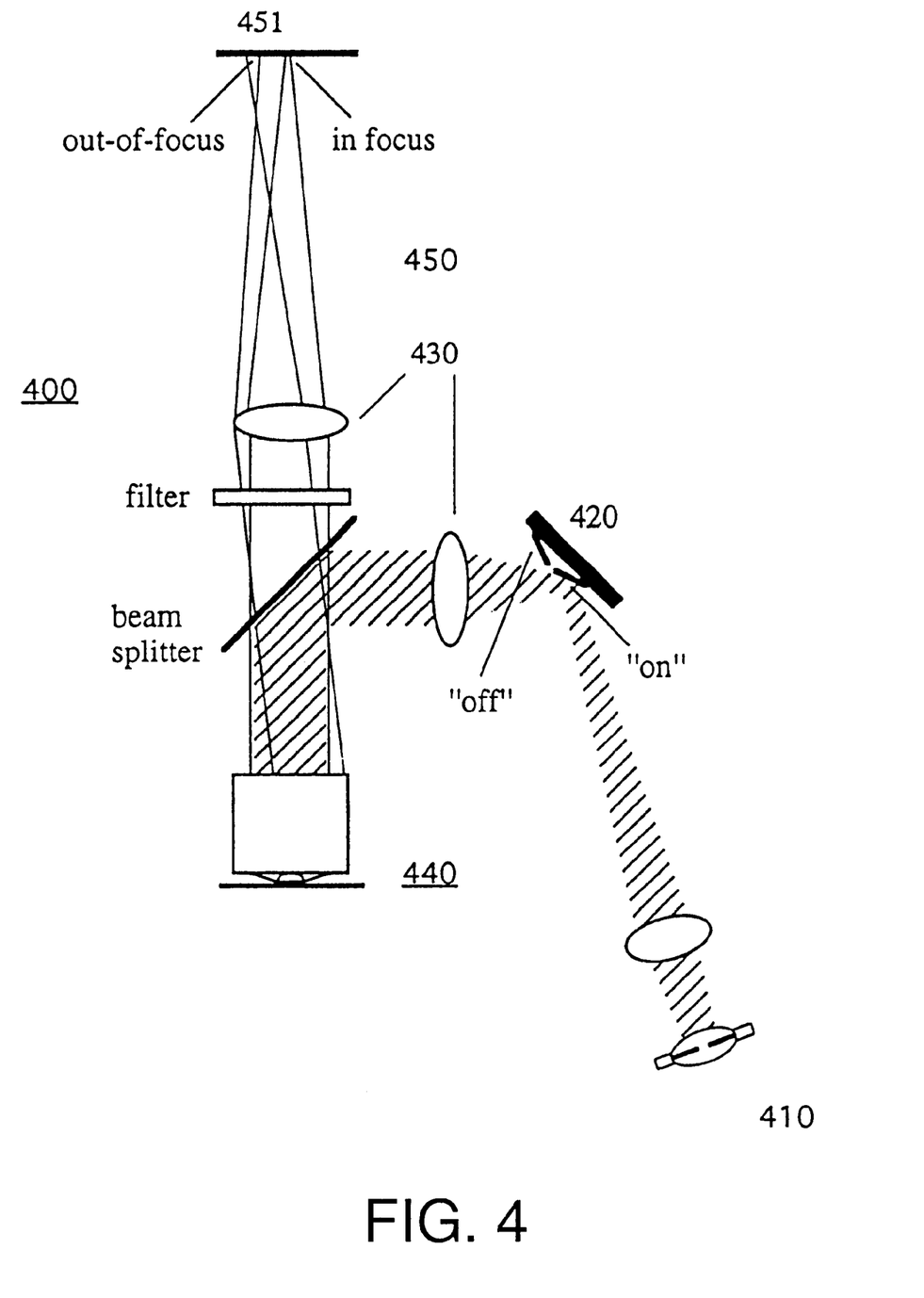
FIG. 4 a schematic view of a dual path single reflection PAM according to the invention.

The SLM can be operated in transmission or reflection mode. Depending on the number of detector systems of the detection means, the PAM can be built as a so-called single path or double path PAM. According to a preferred arrangement, the light source means of the confocal optical imaging system contain a white light lamp and means for wavelength selection.

Preferred applications of the confocal optical imaging system are investigations in the cell and tissue biology, analytical/biotechnological procedures, in-situ hybridization in genetic analysis, formation of an optical mask for position selective photochemical reactions, generation and readout of biochemical arrays on chips, large scale surface inspections in the semiconductor industry, and/or optical recording and read-out.

The invention has the following advantages. The PAM can be implemented as a modular extension of existing microscopes. The out-of-focus light normally rejected with conventional CLSM is collected and used to enhance the in-focus image. Each element of the first group of modulator elements individually is controllable or programmable such that the pattern sequence of illumination spots illuminates at least one predetermined region-of-interest of the object. The implementation of a highly flexible white light microscope capable of full field and/or confocal imaging (with laser as option) is available. Due to a high optical throughput, a white light illumination is allowed yielding an extended applicability of the microscope.

The simultaneous use of both images delivered via the "on"-elements and the "off"-elements is a unique feature of the invention allowing in particular improved deconvolution algorithms.

Further details and advantages of the invention are described in the following with reference to the attached drawings which show in.

The programmable array microscope (PAM) according to the invention can be implemented on the basis of spatial light modulators (in the following: SLM) being operated in transmission (e.g. programmable aperture masks on the basis of liquid crystals or micromechanical switches) or in reflection (e.g. DMD). In the following description, Sigh reference is made in a non-restricting manner to reflection SLM with DMD (as an example). The invention can be put into practice with transmission SLM in an analogous way.

Figure 1:
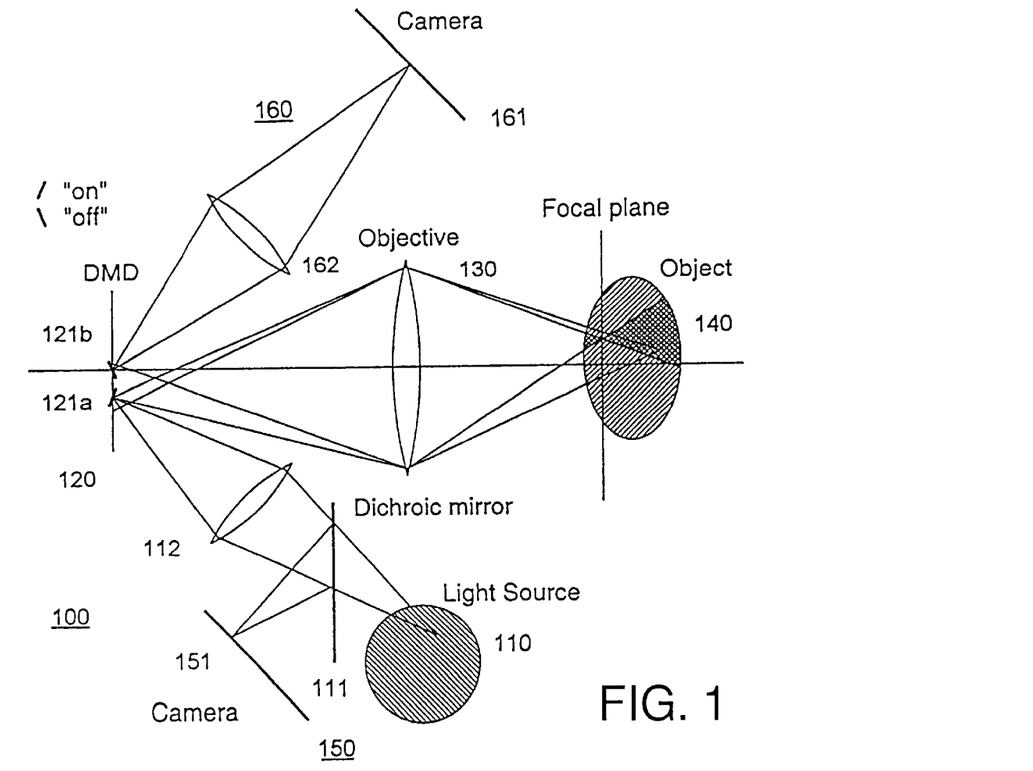
FIG. 1 a schematic view of a fluorescence PAM according to the invention.

FIG. 1 represents a schematic view of a fluorescence PAM 100 according to the invention. The PAM 100 basically includes a light source 110 which is a white lamp or a laser source, a DMD 120 operating as a SLM, imaging optics 130, a probe portion 140 and a detection system 150, 160.

The DMD 120 consists of an array of square mirrors 121$a$, 121$b$, . . . (only one element is illustrated, resp.) each of which can be separately tilted into two stable resting states over a predetermined tilt angle±α to the normal. The value of the tilt angle α depends on the DMD practically used. Each mirror element has a predetermined area which again depends on the DMD. Preferred parameters are e.g. α=±10° with <20 μm square mirrors. Each mirror element can be switched between the resting states with characteristic frequencies in the kHz-range according to a predetermined modulation pattern. The resting states are called "on"- and "off"-positions according to which the respective conjugate contributions and the non-conjugate contributions of the detected light (fluorescence or reflection) are deflected to the detection system 150, 160. Both contributions yield a focal conjugate image $I_c$ and a non-conjugate image $I_{nc}$, resp., on the basis of which the desired confocal image is obtained as outlined below.

The detection system 150, 160 is a common path dual reflection system. This nomenclature is used for the following reason. The "common path" refers to the fact that illumination and detection follow an essentially common optical path between the illumination and detection apertures. The "dual reflection" refers to the fact that the SLM elements can direct light along two subsequent optical paths. Accordingly, the images $I_{nc}$ and $I_c$ (see below) can be collected simultaneously. An alternative is described below as a dual path single reflection system (FIG. 4).

Referring again to FIG. 1, each path contains a two-dimensional camera 151, 161 and detection optics 111, 112, 162, resp. The camera 151 is adapted to detect the light reflected by the mirrors in the "on"-position while the camera 161 receives light reflected in the "off"-position.

In the following, the detection of the focal conjugate image $I_c$ with camera 151 and the non-conjugate image $I_{nc}$ with camera 161 of the system according to FIG. 1 is described. After the detection, further steps of image processing, storing, displaying etc. are added. These steps are not described in detail as far as they are known from scanning systems.

During the frame integration time, the modulation pattern of the SLM (DMD 120) is changed N times in order to generate a confocal image (scanning). The i-th modulation of the SLM is denoted with:

$$S_i(x_d, y_d) = \begin{cases} 1 \text{ if } (x_d, y_d) \text{ is on an "on" element} \\ 0 \text{ if } (x_d, y_d) \text{ is on an "off" element} \end{cases} \quad (1)$$

where $x_d, y_d$ are continuous coordinates of the SLM and the shape and finite size of the elements (mirrors) is included in $S_i$.

Detection Focal Conjugate Image

For obtaining the focal conjugate image $I_c$, the modulations $S_i$ are preferably selected according to a grid pattern approach or a pseudorandom sequence approach which are described in the following. The grid pattern approach has the advantage of easy implementation and yielding a confocal image without post-processing. Although some post-processing is needed in the pseudorandom sequence approach, the frame integration time for a given signal level can be essentially shorter.

(i) Grid Pattern Approach

In the grid pattern approach, the elements (e.g. micromirrors or liquid crystal elements) of the SLM are switched on according to a grid pattern and shifted systematically. The modulation pattern is selected according to $$S_{a,b}(x_d,y_d)=G(x_d-a\eta,y_d-b\eta) \quad (2)$$

wherein $\eta$ is the size of an element (assuming square elements with 100% fill factor) and the index i in eq. (1) has been replaced by two-dimensional integer indices a, b with $0 \leq a < n_x$, $0 \leq b < n_y$. The grid is defined by the property $$G(x_d,y_d)=G(x_d-p\delta_x,y_d-q\delta_y) \, p,q \in N \quad (3)$$

$\delta_x=n_x\eta$ and $\delta_y=n_y\eta$ are the lattice distances of the grid. The real lattice parameters being contained in the function G can yield different suitable shapes. These shapes comprise e.g. square shapes, but pseudo-hexagonal grids or line patterns or more complex shapes are also possible.

The focal conjugate image of an object $O(x_0,y_0,z_0)$ in a coordinate system $(x_0,y_0,z_0)$ in an object space, with a scanning in the axial direction by displacement over the distance $z_s$ is given by:

$$I_{c,S}(x_d, y_d, z_d) = \frac{T}{n_x n_y} \int\int \int_{-\infty}^{+\infty} H_{em}\left(\frac{x_d}{M} - u, \frac{y_d}{M} - v, w\right) \times \quad (4)$$

$$I_G\left(\frac{x_d - \Phi_x}{M} - u, \frac{y_d - \Phi_y}{M} - v, w\right) O(u, v, w - z_s) du dv dw$$

wherein M is the magnification, T the total frame integration time and $H_{em}(x_0,y_0,z_0)$ the emission PSF (point spread function) of the objective. $I_G$ is the total illumination according to:

$$I_G = \int\int_{-\infty}^{+\infty} G(Mu, Mv) H_{ex}(x_0 - u, y_0 - v, z_0) du dv \quad (5)$$

wherein $H_{ex}(x_0,y_0,z_0)$ the excitation PSF of the objective. The total illumination enters eq. (4) with spatially varying shifts in the lateral direction given by $$\Phi_x = x_d \bmod \eta \quad \Phi_y = y_d \bmod \eta \quad (6)$$

The image according to eq. (4) can be viewed as a three-dimensional convolution with a spatially varying PSF, due to the dependence of $\Phi_x$, $\Phi_y$, $x_d$ and $y_d$. The SLM cannot scan continuously and $G(x_d,y_d)$ can (contrary to the continuous motion in known microscopes as e.g. in so-called tandem scanning microscopes) only shift over integer multiples of $\eta$. The distinction is negligible if $\eta/M$ is small compared to the sampling density of the image. For very large $\eta$, a pixelation of the image can occur. The PSF can be made spatially invariant by scanning the SLM over $\eta$ (so-called dithering).

A numerical simulation of the response of an infinitely thin fluorescent plane according to eq. (4) is shown in FIG. 2 as a function of the plane position relative to the focus plane. The simulation is based on square grids of varying lattice distances with for instance the parameters $\delta_x=\delta_y=\{2, 3, 5, 10, 20\}\cdot\eta$, element size $\eta=17 \, \mu$m, NA=1.4, M=100, excitation wavelength $\lambda_{ox}$=633 nm, emission wavelength $\lambda_{em}$=665 nm, refractive index 1.515. These parameters are examples only being adapted to a practical implementation of the invention. The results are normalized compared with the image of a conventional microscope and an ideal confocal microscope. The conventional response (very top line in FIG. 2 or in the measured data of FIG. 5, see below) deviates from the expected straight line as a result of simulating an infinitely large object in a finite sized image. Even for relatively small lattice distances, a sectioning effect is apparent, although with an increased background. With increased lattice distance spacing, the response becomes sharper and the background suppression is more efficient. A similar behaviour of the offset rise as shown in FIG. 2 is given when the spacings of the tiles in the finite length pseudo random sequences are varied.

(ii) Pseudorandom Sequence Approach

In the pseudorandom sequence approach, the elements of the SLM also are switched according to a pseudo-random sequence of finite length. The ideal situation of completely uncorrelated modulation is difficult to achieve in practice, since the number of times that the SLM can change its pattern within a given integration frame is limited. Therefore the complete plane is modulated with a repeated sequence of N two-dimensional patterns $R_i(a,b)$. The number N and the period of one pattern can be selected such that the sequence is short compared with the integration time of one frame. However, another selection is possible. The pattern sequence $R_i(a,b)$ has the property:

$$\sum_{i=0}^{N-1} R_i(a, b) R_i(c, d) = N\delta(a - c, b - d) \quad a, b, c, d \in N \quad (7)$$

wherein $R_i(a,b)$ has the value 1 or −1. A pseudorandom sequence of two-dimensional patterns with the property (7) can be derived from an appropriate mapping of one-dimensional rows or columns of cyclic Hadamard matrices as described by Harwit et al. in "Hadamard Transform Optics" (Academic Press, 1979, New York). Since $S_i(x_d,y_d)$ can only assume values of 0 and 1, the sequence $(1+R_i(a,b))/2$ is used. Another aperture correlation sequence approach according to the above publication of Juškaitis et al. can be used.

On the basis of a grid according to eq. (3) for "tiling" the i-th pattern, the complete modulation pattern $S_i(x_d,y_d)$ is formed. All SLM elements for which $G(x_d-a\eta,y_d-b\eta)=1$ are switched in an identical manner using the sequence $(1+R_i(a,b))/2$. The i-th modulation is given by a summation over all a and b as all elements are switched simultaneously:

$$S_i(x_d, y_d) = \sum_{a=0}^{n_x-1} \sum_{b=0}^{n_y-1} \frac{1}{2}(1 + R_i(a, b)) G(x_d - a\eta, y_d - b\eta) \quad (8)$$

$$= \frac{1}{2} + \frac{1}{2} \sum_{a=0}^{n_x-1} \sum_{b=0}^{n_y-1} R_i(a, b) G(x_d - a\eta, y_d - b\eta)$$

The resulting modulation and accordingly the resulting signal consists of two parts, wherein the first part is a "constant" modulation yielding a conventional full light image.

The focal conjugate image of the object $O(x_0,y_0,z_0)$ in the coordinate system $(x_0,y_0,z_0)$ is given by:

$$I_{c,R}(x_d, y_d, z_s) = \frac{T}{4} \int\int \int_{-\infty}^{+\infty} H_{em}\left(\frac{x_d}{M} - u, \frac{y_d}{M} - v, w\right) \times \quad (9)$$

-continued $$O(u, v, w - z_s) du\, dv\, dw +$$

$$\frac{T}{4} \int \int \int_{-\infty}^{+\infty} H_{em}\left(\frac{x_d}{M} - u, \frac{y_d}{M} - v, w\right) \times$$

$$I_G\left(\frac{x_d - \Phi_x}{M} - u, \frac{y_d - \Phi_y}{M} - v, w\right)$$

$$O(u, v, w - z_s) du\, dv\, dw$$

The pseudorandom sequence approach is very light efficient as 50% of all SLM elements are "on". This is supported by eq. (9) which equals to eq. (4) except of coefficient T/4 instead of $T/n_x n_y$ in the second term. Although both approaches yield the same confocal image for the same grid G $(x_d, y_d)$, the pseudorandom sequence generates a much larger signal, whose APE strength is independent of the sequence length.

A numerical simulation of the response of an infinitely thin fluorescent plane according to eq. (9) is identical to that of FIG. 2 except for a constant offset.

To obtain the confocal image with the pseudorandom sequence approach, a compensation term must be subtracted. This may be a conventional image according to the above technique described by Juškaitis et al. or preferably the non-conjugate image. In the latter case, twice the confocal signal is obtained relative to the former.

Detection Non-conjugate Image

The non-conjugate image $I_{nc}$ can be imaged on the second camera 161. Alternatively, it is possible to image the non-conjugate image $I_{nc}$ on the same camera like the conjugate image $I_c$. An example of such a single camera system of the common path type is illustrated below with reference to FIGS. 7A and 7B.

According to the invention, all of the fluorescent or reflected light from the object falling on the SLM is collected by the cameras. Therefore, the sum of the detected images must be a conventional image, so that the non-conjugate image $I_{nc}$ is the difference between the conventional image and the confocal image given by eq. (4) or (9). For the pseudorandom sequence, the difference between $I_c$ and $I_{nc}$ equals the desired confocal image.

Deconvolution

If the images are obtained according to the above approaches a deconvolution algorithm facultatively can be implemented for a further improved reconstruction or restoration of the object. This represents an essential advantage as the performance of deconvolution algorithms is strongly limited by the nature and SNR of the input image(s). While the detected signal of a confocal microscope can be very noisy with a degraded restoration result, the detected signal of a conventional microscope (which however has inferior resolution and lacks sectioning capability) is much stronger, allowing an improved deconvolution. The invention allows the combination of the advantages of both the confocal and conventional imaging with deconvolution. The above limitation is reduced according to the deconvolution algorithm, wherein both images of one or more optical sections are combined in an appropriate enhancement algorithm.

The enhancement algorithm can be a nearest-neighbor approach where three or more sections are used to generate one single enhanced image or an algorithm where 3D-stacks of images are used for a full 3D reconstruction as it is described by P. J. Verveer and T. M. Jovin in "Journal of the Optical Society of America A" (vol. 14, 1997, p. 1696–1706) completely being included into the present disclosure by reference. The latter model is cited in the following in matrix notation.

A multi-dimensional discrete image is represented with a vector by stacking its pixels. A multi-dimensional linear blurring operation is represented by a matrix. This leads to the imaging equation:

$$i = N[Hf+b] \tag{10}$$

where i, f and b represent the detected image, the object and a known background, resp. The blurring introduced by the microscope optics is assumed to be linear and is given by the multiplication with the matrix H. The function N[.] represents the application of a noise process to each element of its vector argument, usually a Poisson distribution in fluorescence imaging.

The corresponding equations for the conjugate and non-conjugate images $i_c = N[H_c f + b_c]$ and $i_{nc} = N[H_{nc} f + b_{nc}]$ can be combined according to the invention in a single equation $$\begin{pmatrix} i_c \\ i_{Nc} \end{pmatrix} = N\left[\begin{pmatrix} H_c \\ H_{nc} \end{pmatrix} f + \begin{pmatrix} b_c \\ b_{nc} \end{pmatrix}\right] \tag{11}$$

by stacking $i_c$ and $i_{nc}$ into a single vector and $H_c$ and $H_{nc}$ into a composite operator. Since equ. (11) has the same form as equ. (10), the available algorithm can easily modified for (11).

In equ. (10) and (11), the dimensionality of the image is irrelevant. The implementation of H depends on the dimensionality, but the algorithms themselves do not. Normally, the dimensionality is equal to 3 (spatial dimensions). However, further dimensions such as spectral or time dimensions can be added with only a change of H. For instance, if a time dependency is measured for each image pixel or for groups of image pixels, the dimensionality is equal to 4. If blurring is present in the time dimension, it can be deconvoluted from the data by extending H with the time dimension. The capability to apply these deconvolution algorithms also in the spectral and time dimensions, whereas previously they have been restricted to the spatial dimensions, represents an essential advantage of the invention.

Further PAM Arrangements

Figure 3:
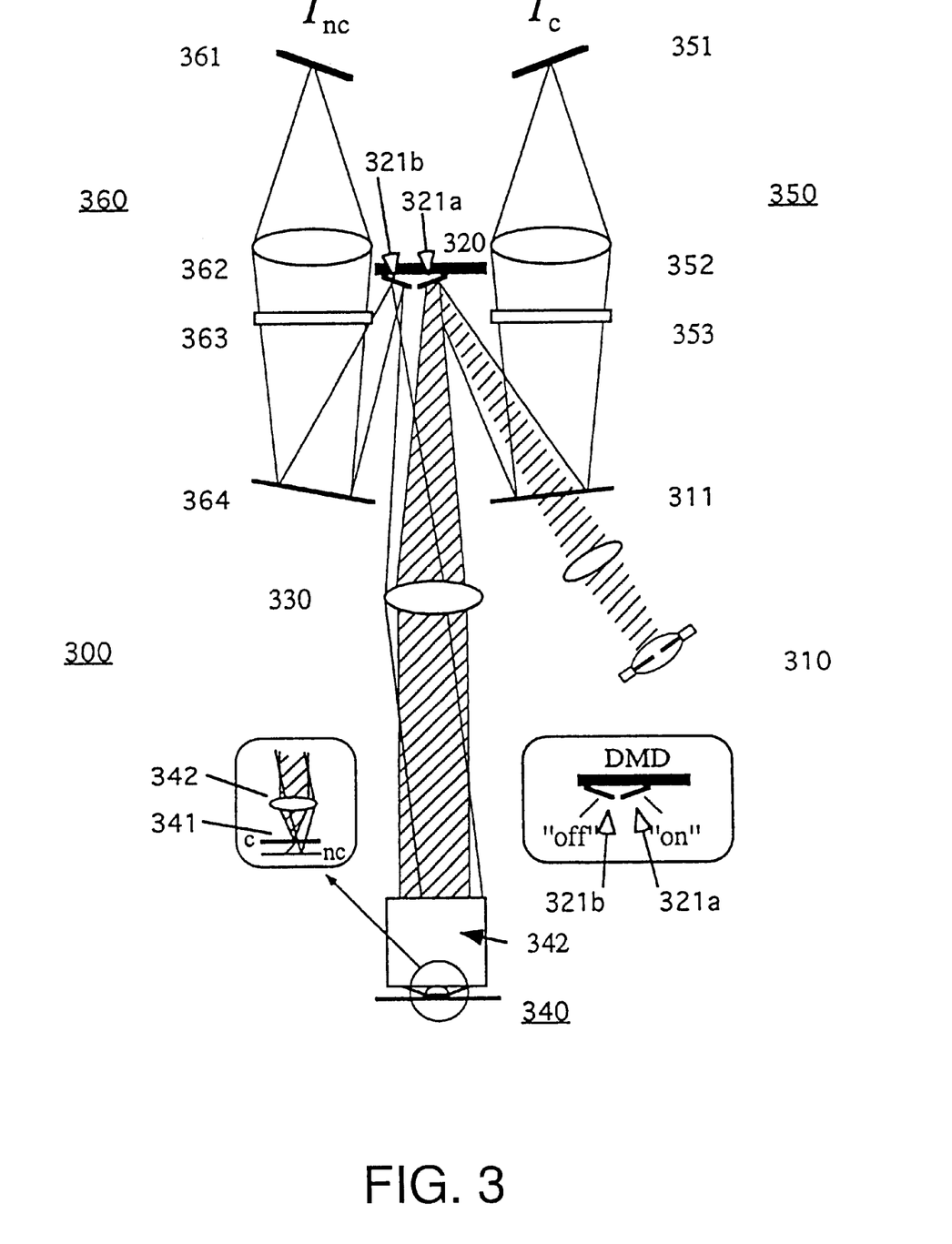
FIG. 3 a schematic view of a common path dual reflection PAM according to the invention.

FIG. 3 shows a schematic view of a common path dual reflection PAM 300 according to the invention. As in FIG. 1, PAM 300 basically includes a light source 310, a SLM 320, imaging optics 330, a probe portion 340 and detection systems 350, 360. PAM 300 can be implemented with a Digital Light Processing kit (e.g. of Texas Instruments, Dallas, USA) as a light source in combination with a microscope with side illumination ports (e.g. Zeiss Axioplan) and CCD cameras (e.g. CH220 cameras of Photometrics, Tucson, USA, with Kodak KAF1400 CCD sensors). The probe portion 340 contains a driving device for z-displacements (perpendicular to the focus plane) like a computerized focus control e.g. of Ludl Electronics Products, Hawthorne, USA. PAM 300 additionally contains a driving unit for controlling the modulator elements, a control unit, calculation and deconvolution circuits and display units (not shown). The illumination path is hatched.

The SLM 320 being a DMD (as described above) is illuminated with the light source 310 which is a filtered white lamp. The filter can be a band pass for a predetermined wavelength range of interest. The reflections from the "on"-elements 321a (only one element is illustrated) are focused with the objective 342 into the object plane 341. Fluorescence light stimulated in the object plane 341 returns through the same optical path to the SLM 320 where it is reflected over the semitransmissive mirror 311 along the $I_c$ path to the camera 351 through a filter 353 and a lens 352. Light originating from the out-of-focus positions (e.g. plane nc in the inset of FIG. 3) is reflected by the "off"-elements 321b (only one element is illustrated) over the mirror 364 along the $I_{nc}$ path through a filter 363 and a lens 362 to the camera 361. The confocal arrangement allows to reject light from the focal plane as the corresponding SLM elements are turned off. The filters 353 and 363 are preferably long pass filters being adapted for fluorescence measurements ($\lambda_{em} > \lambda_0$).

As in FIG. 1, the focal conjugate image $I_c$ is collected with camera 351 and the non-conjugate image $I_{nc}$ is collected with camera 361.

FIG. 4 shows a schematic view of a dual path single reflection PAM 400 being another embodiment of the invention. The "dual path" refers to the fact that illumination and detection follow two different optical paths. Further, although the SLM is capable of directing light in two directions, only a single reflection direction is used. While in the embodiment of FIG. 3, the confocality is defined by the same SLM element, according to FIG. 4 the confocality is definded by the SLM element on the illuminations side and by the CCD pixels on the detection side.

PAM 400 is adapted in a simplified manner to a conventional microscope with one optical axis on which the probe portion 440, imaging optics 430 and the detection system 450 are arranged. The microscope can comprise the same basic components as noted above. The illumination light from the light source 410 is reflected via the SLM 420 and a side port of the microscope to a beam splitter (e.g. half-silvered mirror) in the optical axis.

As the detection system 450 contains only one camera 451, the separation of the $I_c$ and $I_{nc}$ images is done on the basis of an analysis of the camera images. The dual path PAM in combination with the analysis reconstruction has the advantages of easy implementability and high efficiency and light throughput.

According to the shifting grid approach, the image pixels of the "on"-elements are found in the recorded set by selecting the maximal gray values. Since each SLM element of the DMD is to be switched "on" exactly once in one series, the pixels of the "on"-states have maximum intensity. The $I_c$ image is reconstructed from these selected pixels while the $I_{nc}$ image results from the sum of the remaining pixels.

In the pseudorandom sequence approach, the sum of the brightest half of the pixels is the $I_c$ image while the other half represents the $I_{nc}$ image. As the $I_c$ and $I_{nc}$ images represent the sum and difference of a conventional and a confocal image, resp., the confocal image can be calculated by the difference $I_c - I_{nc}$.

Figure 5:
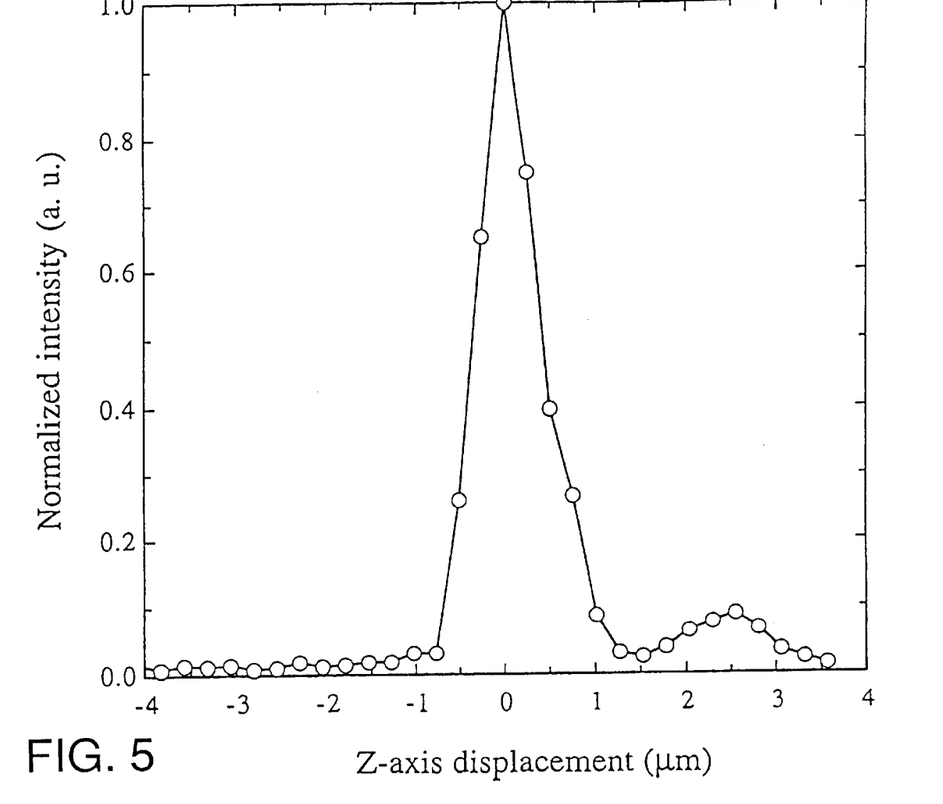
FIG. 5 an illustration of the axial response of a PAM.

FIG. 5 shows the axial response of a PAM using a DMD with a 32×32 square lattice (corresponding to 544 $\mu$m spot distance), a 100×1.3 NA (Numerical Aperture) oil immersion objective and $\lambda$=450–490 nm. The axial z-scan of a reflective surface yields confocal images with intensities showing a strong optical sectioning ability in accordance with the simulation in FIG. 2.

Figure 6:
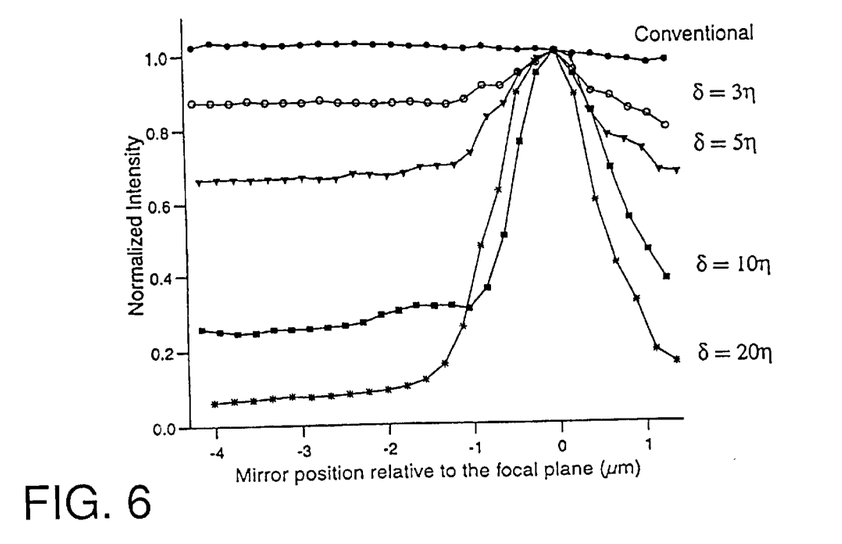
FIG. 6 an illustration of the sectioning and background suppression.

An experimental verification of the supression of background signal during optical sectioning is shown in FIG. 6. A reflective surface (mirror) is scanned along the z-axis through the focus plane. The parameters are square lattices with distances $\delta_x = \delta_y = \{3, 5, 10, 20\} \cdot \eta$, $\eta = 17$ $\mu$m (corresponding to 16 $\mu$m size plus 1 $\mu$m between mirror gap), a 100×1.3 NA oil immersion objective and $\lambda$=450–490 nm.

Figure 7A:
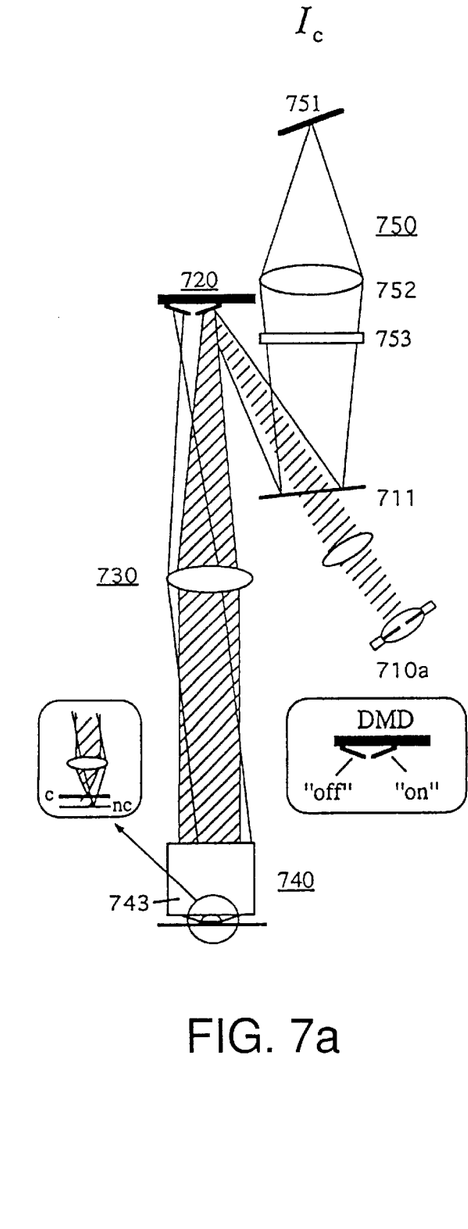
FIGS. 7A, 7B: schematic views of a single camera common path dual reflection PAM according to the invention.
Figure 7B:
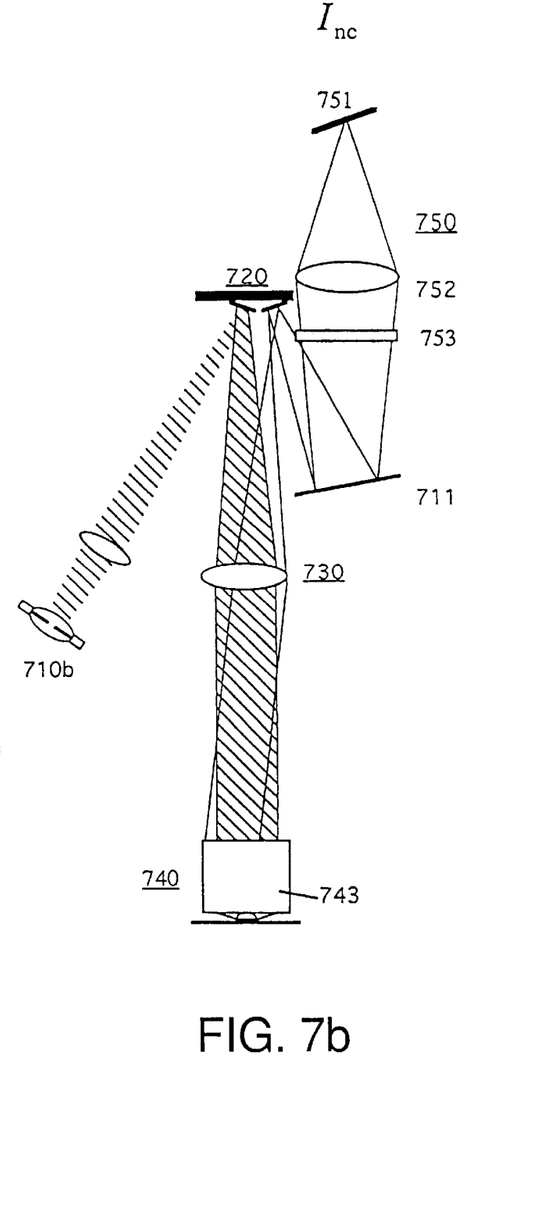
Figure 8:
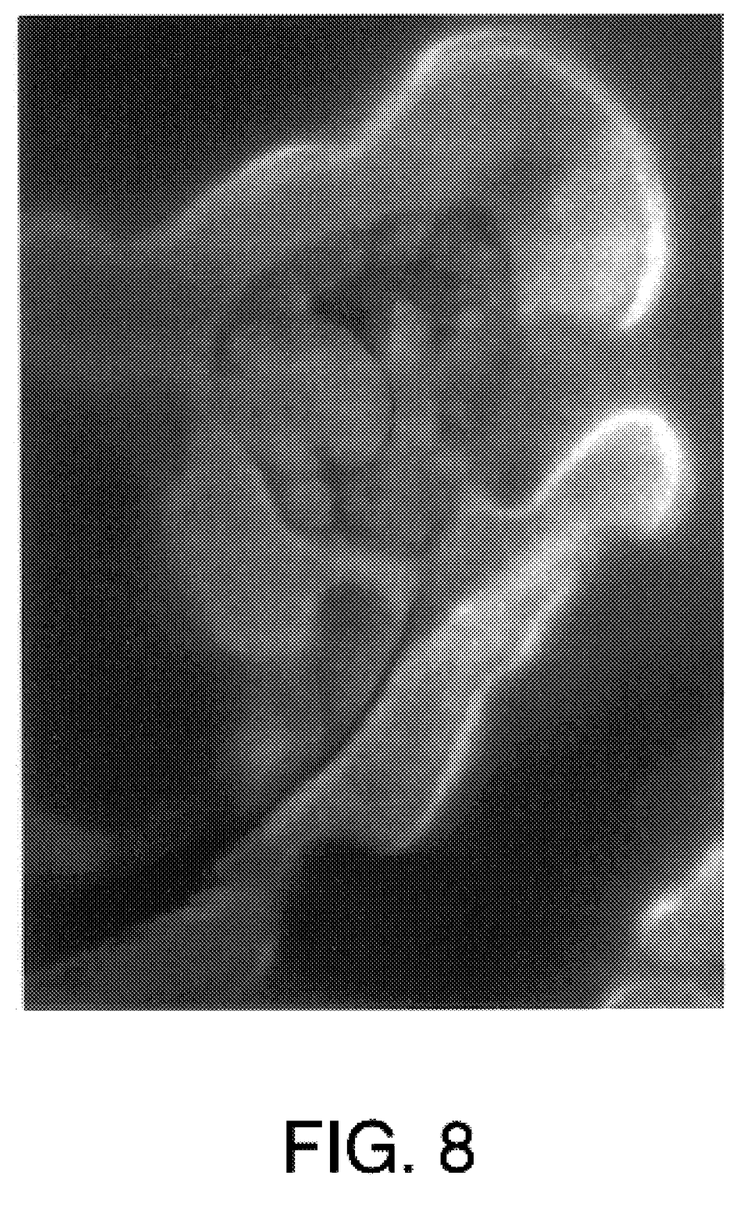
FIG. 8: a microscopic image taken according to the invention showing optical sectioning capability.

FIGS. 7A and 7B show an alternative example of common path dual reflection PAM 700 with two illumination axes using only a single camera for image collection. This concept has certain advantages as to the cost saving use of only one camera and the simpler optical alignment of the elements forming the optical paths for the images $I_c$ and $I_{nc}$.

PAM 700 comprises basically similar components as PAM 300 shown in FIG. 3, in particular light sources 710a, 710b, a SLM 720, imaging optics 730, an objective 743, a probe portion 740 and a detection system 750. The collection of one full image is accomplished in two steps. For the collection of image sequences, the images $I_c$ and $I_{nc}$ are collected alternately.

First the image $I_c$ is collected by illuminating the object from a first side with the light source 710a via a semitransmissive mirror 711, the SLM 720 and the imaging optics 730 and detecting the focal plane image along the reversed optical path via the SLM 720, the semitransmissive mirror 711, a filter 753, a lens 752 with the camera 751. This situation is shown in FIG. 7A. The pattern used for controlling the SLM 720 is called the "positive" representation corresponding to the pseudo-random or other sequences displayed on the SLM.

Second, as shown in FIG. 7B, the image $I_{nc}$ is collected by illuminating the object from a second side (light source 710b) while controlling the SLM 720 with a so-called "negative" representation where all off-elements are controlled according to the sequence used for controlling the on-elements in the above first step. As the illumination light is directed along a second axis, being symmetrically arranged to the first step illumination the positions of the images $I_c$ and $I_{nc}$ are reversed.

The two-sided illumination can be implemented according to various ways, e.g. by a single light source being directed by mirrors along the two illumination axes or by two identical light sources.

Further Advantages and Applications

The improved performance of a PAM according to the invention compared to a conventional Confocal Laser Scanning Microscope (CLSM) can be derived from the following relative parameters (PAM/CLSM): $\alpha$ relative irradiance at the focal plane, $\beta$ relative detector quantum efficiency, $\gamma$ relative dwell time per pixel, and $\delta$ relative number of scanning apertures. For the following examples, an image field of $10^3 \times 10^3$ elements (total pixel number: $N=10^6$) and a grid period n=10 are assumed. Accordingly, $\delta$ equals $N/n^2 = 10^4$. Typical values for and $\beta$ are $10^{-2}$ (full-field lamp illumination compared to a diffraction limited laser source) and 10 (CCD sensor compared with photomultiplier cathode). With a dwell time of 1 ms (PAM) and 10 $\mu$s (CLSM), $\gamma$ is 100 representing a proportional increase in speed ($\delta/\gamma$). The relative signal strength being described with $\alpha \cdot \beta \cdot \gamma$ would be 10-fold higher for the PAM. The pseudorandom sequence approach yields a further increase in signal level ($n^2/2$ in this example) due to the 50% active state of each SLM element. Accordingly, the pseudorandom sequence approach is preferred for microscopic investigation of biological samples in vivo.

The PAM has the potential to increase the acquisition speed two orders of magnitude. Although the lamp source of the PAM yields a much lower irradiance at the focal plane than a laser in a CLSM, this is compensated by the high number of points that are scanned in parallel (allowing longer dwell times) and the higher quantum efficiency of the detector.

Preferred applications of the invention are in the cell and tissue biology, delivering image data as intermediate information for real-time medical diagnostic procedures, analytical/biotechnological procedures (such as e.g. in-situ hybridization in genetic analysis), readout of biochemical arrays on chips, the large scale surface inspection e.g. in the semiconductor industry, and/or optical recording and readout.

A microscopic system according to the invention allows the simultaneous initiation and monitoring of photochemical reactions e.g. for protein synthesis. The initiation is achieved by the irradiation of predetermined substances with a suitable wavelength while the monitoring comprises microscopic measurements with these substances or the reaction products. A particular application is the formation of an optical mask for position selective photochemical reactions (e.g. for the synthesis of DNA sequences) on a substrate.

What is claimed is:

1. A confocal optical imaging system comprising:

light source means for illuminating an object to be investigated;

detector means with at least one two-dimensional detector camera; and spatial light modulator means with a first and a second group of modulator elements, wherein the first group of modulator elements is adapted to illuminate the object to be investigated according to a predetermined pattern sequence of illumination spots focused to conjugate locations of the object wherein detection light from the conjugate locations forms a first image $I_c$ at the detector means, and wherein the second group of modulator elements is adapted to collect detection light from non-conjugate locations of the object wherein the detection light from the non-conjugate locations forms a second image $I_{nc}$ at the detector means, wherein each element of the first group of modulator elements individually is controllable such that the pattern sequence of illumination spots is represented by a time-dependent systematically shifting grid patterns and the first image $I_c$ is a confocal images, and the second image $I_{nc}$ is a difference image between a non-confocal image and the first image $I_c$.

2. A confocal optical imaging system comprising:

light source means for illuminating an object to be investigated;

detector means with at least one two-dimensional detector camera; and spatial light modulator means with a first and a second group of modulator elements which receives light from the light source means, wherein the first group of modulator elements is adapted to illuminate the object to be investigated according to a predetermined pattern sequence of illumination spots focused to conjugate locations of the object wherein detection light from the conjugate locations forms a first image $I_c$ at the detector means, and wherein the second group of modulator elements is adapted to collect detection light from non-conjugate locations of the object wherein the detection light from the non-conjugate locations forms a second image $I_{nc}$ at the detector means, and wherein each element of the first group of modulator elements individually is controllable such that the pattern sequence of illumination spots is represented by a time-dependent pattern based on a pseudo-random sequence of finite length, and the first image $I_c$ is a superposition of a confocal image and a non-confocal image, and the second image $I_{nc}$ is a difference image between a confocal image and a non-confocal image.

3. The confocal optical imaging system according to claim 1 or 2, wherein the pattern sequence is selected from the group consisting of:

a systematically shifting line or lines either spaced regularly, according to a pseudo-random sequence of finite length, according to a s-matrix type Hadamard sequence or randomly, regular dot lattices in standard geometrical shapes, random patterns or pseudo-random patterns of finite length based on so-called Walsch, Sylvester, Hadamard or Golay sequences, square or rectangular grids formed from intersecting line patterns, a full field "on" pattern, plane filling patterns being adapted to turn on the spatial light modulation elements an integral number of times sequentially produced on the spatial light modulation, a repeated sequence of two-dimensional patterns being derived from rows or columns of cyclic Hadamard matrices, or a combination of the above pattern sequences.

4. The confocal optical imaging system according to clam 1 or 2, wherein the detector means is adapted to collect the light available at an image plane of the system by a combined detection of both images $I_c$ and $I_{nc}$.

5. The confocal optical imaging system according to claim 1 or 2, wherein the spatial light modulator means comprises a transmitting mask or a reflecting mask.

6. The confocal optical imaging system according to claim 5, wherein the reflecting mask is a digital micromirror device comprising a plurality of micromirrors each of which can be separately tilted into two stable resting states over a predetermined tilt angle $\pm\alpha$ to the normal, wherein the first and second resting states contribute to the first and second group of modulations elements, respectively.

7. The confocal optical imaging system according to claim 1 or 2, wherein the detector means comprises two detector systems each containing a two-dimensional camera for collecting the first or the second images $I_c$ and $I_{nc}$ respectively.

8. The confocal optical imaging system according to claim 1 or 2, wherein the detector means comprises one detector system with one two-dimensional camera for collecting the first and second images $I_c$ and $I_{nc}$ simultaneously or sequentially.

9. The confocal optical imaging system according to claim 8, wherein the two-dimensional camera is adapted to collect the first and second images simultaneously, said imaging system further comprising a circuit for image analysis being adapted to separate the first and second images $I_c$ and $I_{nc}$.

10. The confocal optical imaging system according to claim 8, wherein the two-dimensional camera is adapted to collect the first and second images sequentially such, that firstly each element of the first group of modulator elements individually being controllable according to said pattern sequence for collecting the first image $I_c$ and subsequently each element of the second group of modulator elements individually being controllable according to said pattern sequence for collecting the second image $I_{nc}$, wherein the light source means comprise first and second light sources illuminating the object along two axes.

11. The confocal optical imaging system according to claim 1 or 2, wherein the detection light is fluorescence or phosphorescence light or Raman-scattered light emitted from the object.

12. The confocal optical imaging system according to claim 1 or 2, wherein the optical imaging system is part of a programmable spatially light modulated confocal microscope.

13. A confocal optical imaging method, comprising the steps of:

directing light from light source means to a spatial light modulator comprising a first and a second group of modulator elements;

directing light from the first group of modulator elements to an object to be investigated according to a predetermined pattern sequence of illumination spots focused to conjugate locations of the object; and collecting a first image $I_c$ with detector means by directing detection light from the conjugate locations to the detector means; and, collecting detection light from non-conjugate locations of the object with the second group of modulator elements and forming a second image $I_{nc}$ by directing that detection light from the non-conjugate locations to the detector means, wherein each element of the first group of modulator elements individually is controlled such that the pattern sequence of illumination spots is a time-dependent systematically shifting grid pattern illuminating at least one predetermined region-of interest of the object, and the first image $I_c$ is a confocal image and the second image $I_{nc}$ is a difference image between a non-confocal image and the first image $I_{nc}$.

14. A confocal optical imaging method, comprising the steps of:

directing light from light source means to a spatial light modulator comprising a first and a second group of modulator elements;

directing light from the first group of modulator elements to an object to be investigated according to a predetermined pattern sequence of illumination spots focused to conjugate locations of the object; and collecting a first image $I_c$ with detector means by directing detection light from the conjugate locations to the detector means; and, collecting detection light from non-conjugate locations of the object with the second group of modulator elements and forming a second image $I_{nc}$ by directing that detection light from the non-conjugate locations to the detector means, wherein each element of the first group of modulator elements individually is controlled such that the pattern sequence of illumination spots is a time-dependent pattern based on a pseudo-random sequence of finite length illuminating at least one predetermined region-of interest of the object, and the first image $I_c$ is a superposition of confocal image and a non-confocal image and the second image $I_{nc}$ is a difference image between a confocal image and a non-confocal image.

15. The confocal optical imaging method according to claim 14, wherein each element of the first group of modulator elements individually is controlled such that the pattern sequence of illumination spots is represented by a repeated sequence of two-dimensional patterns.

16. The confocal optical imaging method according to claim 13, wherein the detector means comprise two detector systems each containing a two-dimensional camera and the first and second images are collected by the two cameras, respectively.

17. The confocal optical imaging method according to claim 13, wherein the detector means comprise one detector system with a two-dimensional camera and the first and second images both are collected by the camera.

18. The confocal optical imaging method according to claim 17, further comprising an image analysis for separating the first and second images, wherein in the collected image the image pixels of the first image are found by selecting the maximal gray values or by selecting the brightest half of the pixels.

19. The confocal optical imaging method according to claim 13, wherein the step of directing light from the light source means to the spatial light modulator means includes a wavelength selection.

20. The confocal optical imaging method according to claim 13, further comprising a deconvolution procedure wherein the object is reconstructed with a deconvolution algorithm combining both first and second images of one or more collected optical sections.

21. The confocal optical imaging method according to claim 20, wherein the deconvolution algorithm includes an enhancement algorithm with a nearest-neighbor approach wherein three or more sections are used to generate one single enhanced image.

* * * * *